Oct. 24, 1939.                J. DAMON                    2,177,206
                           POACHED EGG CUP
                          Filed Nov. 26, 1938
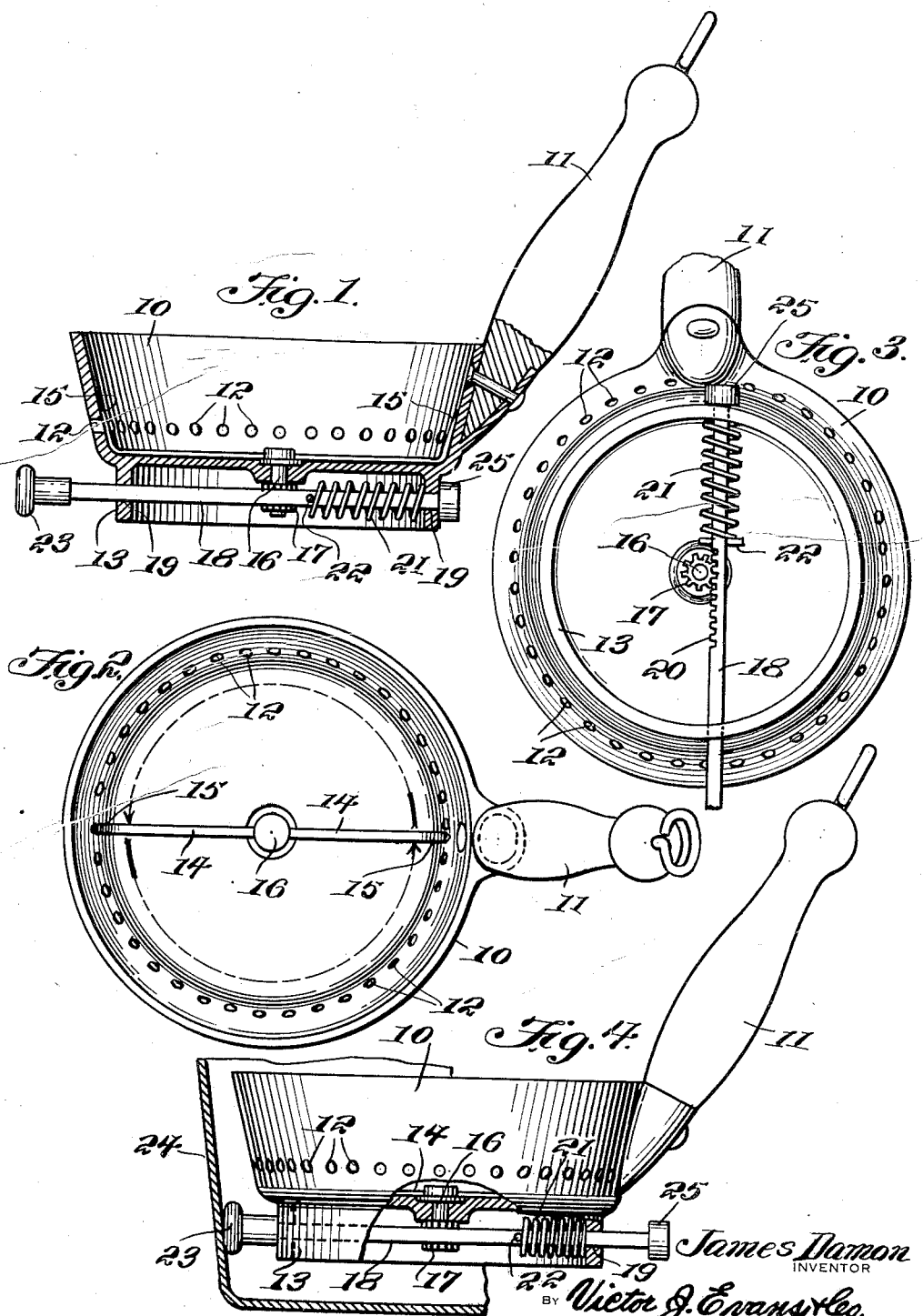
James Damon
INVENTOR
BY Victor J. Evans & Co.
ATTORNEYS
WITNESS J. L. Wright Patented Oct. 24, 1939

2,177,206

UNITED STATES PATENT OFFICE 2,177,206

POACHED EGG CUP

James Damon, Middletown, N. Y.

Application November 26, 1938, Serial No. 242,589

1 Claim. (Cl. 53—1)

This invention relates to poached egg cups and has for an object to provide an individual cup for each egg to be poached, having means adapted to loosen the bottom of the poached egg which always sticks to the bottom of the poaching vessel, and to do so without breaking the yolk.

A further object is to provide a device of this character which will be formed of a few strong simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claim without departing from the spirit or sacrificing any of the advantages of the invention.

In the accompanying drawing forming part of this specification,

Figure 1 is a longitudinal sectional view, with parts in elevation, of a poached egg cup, constructed in accordance with the invention.

Figure 2 is a plan view of the cup shown in Figure 1.

Figure 3 is a bottom plan view of the cup.

Figure 4 is a side elevation of the cup showing the poached egg separator in position to be actuated by contact with the side of the hot water vessel.

Referring now to the drawing in which like characters of reference designate similar parts in the various views, 10 designates a cup having a handle 11 secured thereto and extending upwardly from the side of the cup, the side of the cup being provided with perforations 12. An annular flange 13 extends downwardly from the bottom of the cup.

A thin steel blade 14 extends across the upper surface of the bottom of the cup and is provided with upturned ends 15 which contact with the side of the cup. The blade is adapted to be turned to effect the separation of the poached egg from the bottom and side of the cup.

A shaft 16 is journaled in the center of the bottom of the cup, and is secured to the center of the blade in any preferred manner. A pinion 17 is secured to the bottom of the shaft, as best shown in Figure 3. A rod 18 is located below the bottom of the cup and is slidably mounted in openings 19 formed in the flange 13 of the cup. The rod is provided with rack teeth 20 which engage the pinion, whereby movement of the rod effects rotation of the blade.

A helical spring 21 is sleeved on the rod between the flange 13 of the cup and a pin 22 which extends through the rod. One end of the rod is equipped with a button 23. The spring 21 is compressed when the rod is moved in one direction by impinging the button 23 against the side wall of a hot water vessel 24 and moves the rod to normal position after each actuation. The rod is provided at the end opposite the button with a head 25 which contacts with the flange 13 and limits movement of the rod by the spring.

In operation the egg is broken into the cup and boiling water is admitted through the openings 12. When the egg has been poached the cup is moved to impinge the button 23 against the wall of the cooking vessel 24 with resultant movement of the rod 18 endwise to rotate the pinion 17 and rotate the blade to sever the egg from the bottom of the cup without breaking the yolk.

When the cup is lifted from the cooking vessel the spring 21 returns the rod to normal position.

From the above description it is thought that the construction and operation of the invention will be fully understood without further explanation.

What is claimed is:

An egg poacher comprising a cup, a handle secured to the cup, the side of the cup being provided with perforations, an annular flange extending downwardly from the bottom of the cup, a thin metal blade extending across the upper surface of the bottom of the cup and provided with upturned ends contacting with the side of the cup, a vertically disposed shaft journaled in the center of the bottom of the cup secured to the blade and provided at its lower end with a pinion, a horizontally disposed shaft disposed below the bottom of the cup and slidably mounted at both ends in the flange of the cup, the last named shaft being provided with rack teeth engaging the pinion and projecting at both ends beyond the flange, buttons on the ends of the second named shaft, movement of the shaft by contacting one of the buttons with the wall of a boiling vessel in which the cup may be immersed effecting rotation of the pinion to rotate the blade to effect the separation of a poached egg from the bottom and side of the cup, and a spring sleeved on and connected to the shaft and engaging the flange of the cup to return the shaft to initial position after each actuation.

JAMES DAMON.